J. A. BUCHANAN.
DRAFT APPLIANCE.
APPLICATION FILED MAR. 13, 1914.
Reissued May 26, 1914.
13,733.
2 SHEETS—SHEET 1.
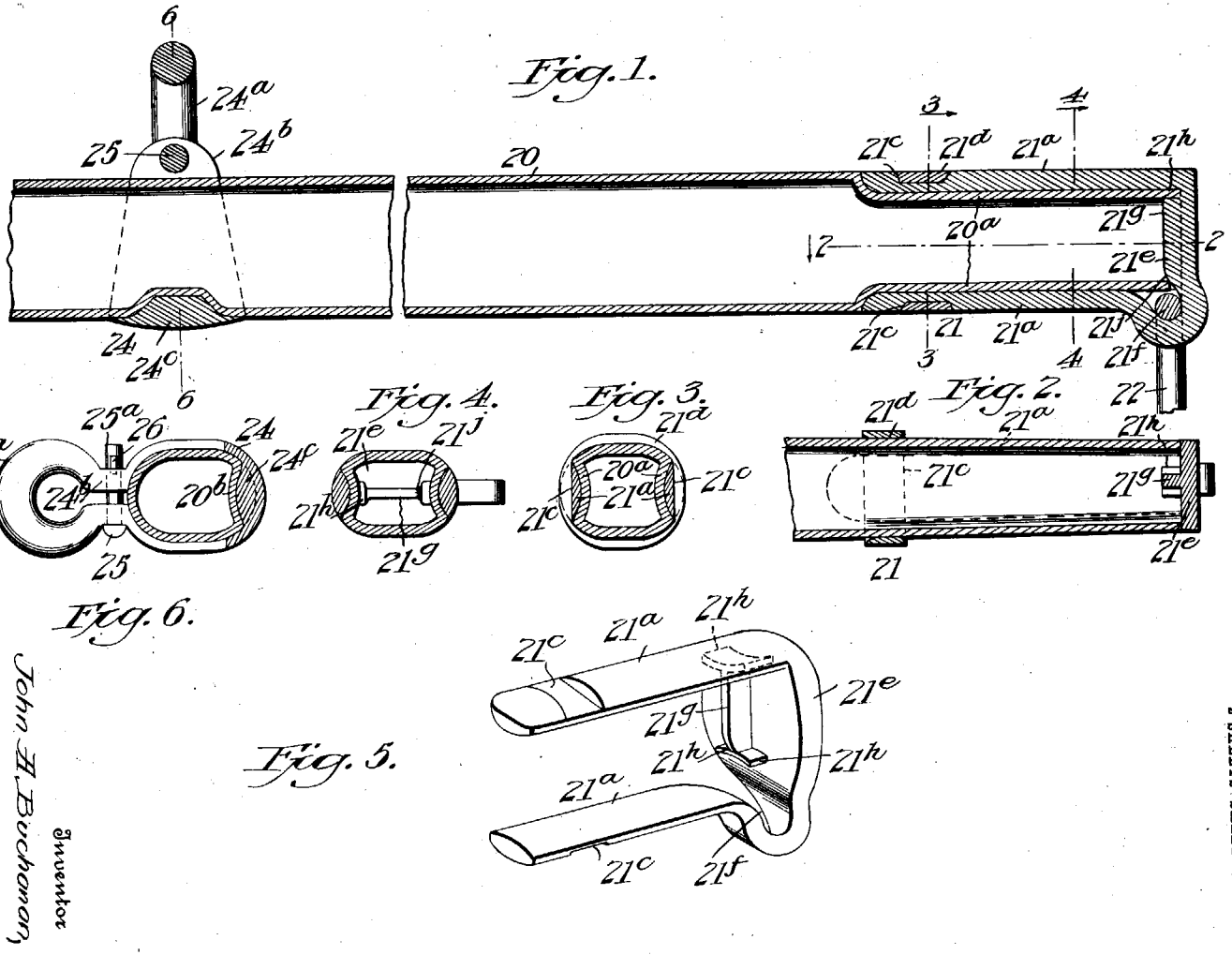
Witnesses
T. L. Moschell
A. M. Wilson
Inventor
John A. Buchanan,
By Horace C. Seitz
Attorney J. A. BUCHANAN.
DRAFT APPLIANCE.
APPLICATION FILED MAR. 13, 1914.
Reissued May 26, 1914.
13,733.
2 SHEETS—SHEET 2.
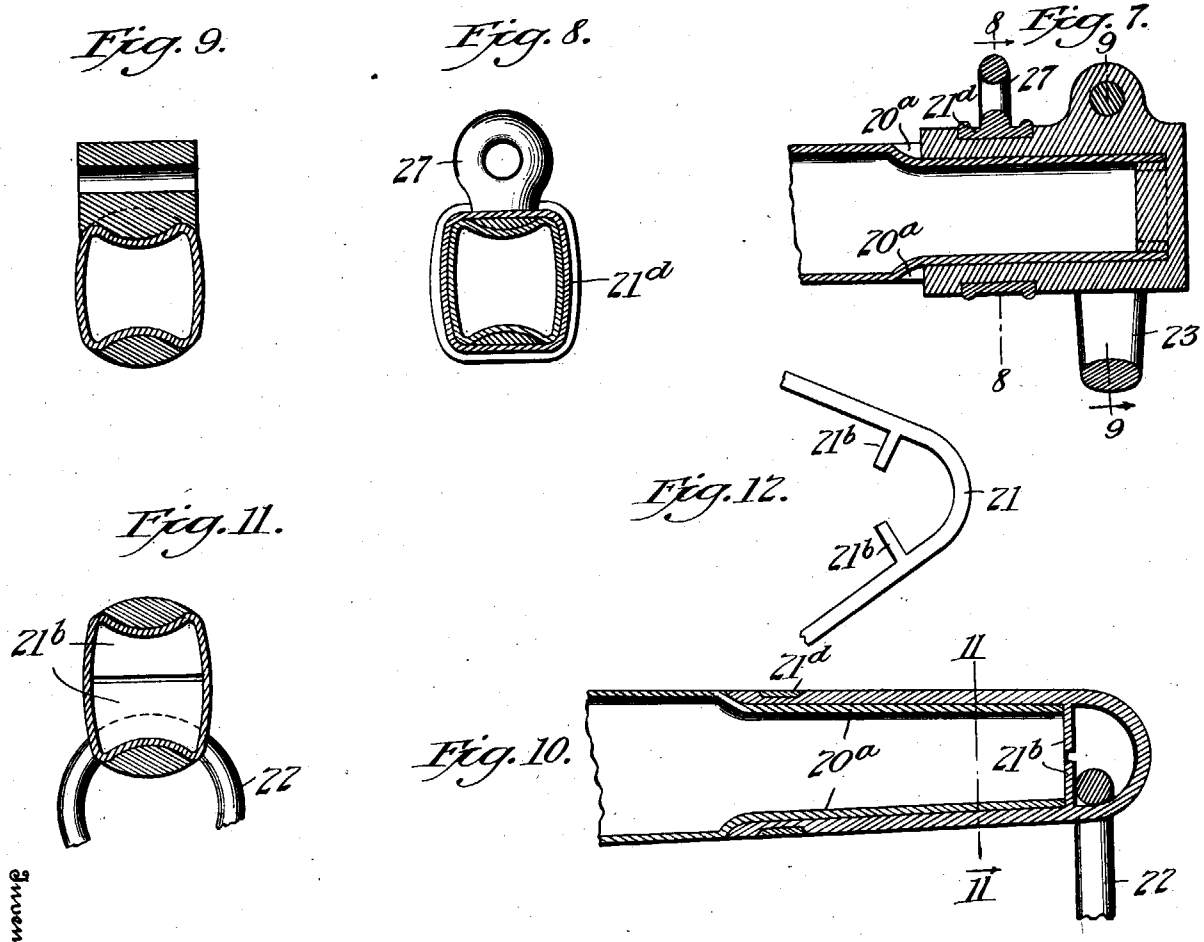
Witnesses
T. L. Mochlin
A. M. Wilson
Inventor
John A. Buchanan,
By Horace G. Seitz
Attorney

UNITED STATES PATENT OFFICE.

JOHN A. BUCHANAN, OF PITTSBURGH, PENNSYLVANIA.

DRAFT APPLIANCE.

13,733. Specification of Reissued Letters Patent. Reissued May 26, 1914.

Original No. 1,077,797, dated November 4, 1913, Serial No. 744,755. Application for reissue filed March 13, 1914. Serial No. 824,571.

*To all whom it may concern:*

Be it known that I, JOHN A. BUCHANAN, a citizen of the United States, residing at Pittsburgh, in the county of Allegheny and State of Pennsylvania, have invented certain new and useful Improvements in Draft Appliances, of which the following is a specification.

The present invention relates to improvements in draft appliances, such as swingle-trees, double-trees, eveners, neck-yokes, etc., the invention being adaptable for use in each of these connections, and it is intended that the term "draft appliance" shall cover these various forms.

The invention pertains more particularly to constructions in which the bar is made of metal and of tubular form. Draft appliances of this type provide for maximum strength and efficiency, but, owing to the increased cost of manufacture, etc., are more expensive than the general and well-known form of bar made of wood. Among the causes for increased cost is the number of manipulations required in preparing the bar for use, these including tapering and flattening of the bar by successive operations, with the several heatings for these purposes, the subsequent re-heating and fashioning of the end of the bar to receive the end fitting, and then the addition of the fitting. These various heatings not only increase the cost by reason of the time required and the handling necessary to perform them, but in addition materially affect the texture of the bar, thus requiring the use of fittings which will tend to overcome the deficiencies of the bar, requiring the formation of special and expensive forms of fittings for this purpose. These various manipulations require the use of expensive machinery, etc., the result being that the completed bar is relatively expensive.

The present invention has for its objects the provision of a construction which will provide the maximum efficiency of the bar now in use and at the same time materially reduce the cost of manufacture through the elimination of a number of heating processes, especially that affecting the center, and by the use of a relatively inexpensive fitting, and at the same time practically retain the bar free from perforations by the elimination of bolts, etc., as securing means.

Other objects are to provide a construction in which the bar and fitting configurations are such as to provide mutual coöperation in providing maximum strength and low cost of manufacture; to provide a construction which is simple and efficient in operation, durable in construction, which can be provided by simple operations, and which is neat and attractive in appearance.

To these and other ends, the nature of which will be readily understood as the invention is hereinafter disclosed, said invention consists in the improved construction and combination of parts, hereinafter fully described, illustrated in the accompanying drawings, and more particularly pointed out in the appended claims.

In the accompanying drawings, in which similar reference characters indicate similar parts in each of the views:—Figure 1 is a longitudinal sectional view of a portion of a bar constructed in accordance with a preferred form of the invention. Fig. 2 is a sectional view taken on line 2—2 of Fig. 1. Figs. 3 and 4 are cross-sectional views taken respectively on lines 3—3 and 4—4 of Fig. 1. Fig. 5 is a perspective view of the fitting shown in Fig. 1. Fig. 6 is a cross-sectional view taken on line 6—6 of Fig. 1. Fig. 7 is a fragmentary longitudinal sectional view showing a modified form of end fitting. Figs. 8 and 9 are cross-sectional views taken respectively on lines 8—8 and 9—9 of Fig. 7. Fig. 10 is a fragmentary longitudinal section showing another modified form of end fitting. Fig. 11 is a cross-sectional view taken on line 11—11 of Fig. 10. Fig. 12 is a detail view of the end fitting shown in Fig. 10 prior to being placed in position.

One of the principal features of the invention is the construction of the end of the bar by means of which the end fitting is not only held in place but the formation of the end configuration is such as to provide a taper to the bar. This general arrangement is provided preferably in the following manner: The bar, indicated at 20, is initially a tube or pipe endless in cross-section, which is then operated upon to flatten opposite sides giving the tube a somewhat oval configuration in cross-section, this operation however, not providing any material taper to the bar. The end of the bar which is to receive the fitting is then heated a distance suitable to receive the fitting and then passed into rolls by means of which the extremities of the major axis of the bar are depressed to form channels, as shown for instance, in Figs. 3 and 4, the depression extending longitudinally of the bar a suitable distance. This depressing action, being on the opposite sides, has the effect of tapering the end of the bar toward its ends, the change in configuration tending to carry the metal into the depressed portion. This action may be increased by tapering the bottom of the channel with the point of greatest depth at the end of the bar, this action obviously having the effect of providing a taper to the end of the bar as a whole. While this is the preferred way in which the channels are formed, it will be understood that they may be provided by means other than by rolls, but in either event, it will be understood that since the formation of the depressions or channels has a tendency to taper the end of the bar, there is no necessity for providing the several separate heatings of the bar for this purpose, so that a number of reheating operations are eliminated, decreasing the cost of manufacture to that extent and at the same time eliminating the harmful effect on the metal which is produced by increasing the number of heatings to which the bar is subjected, especially at its longitudinal center. This is of an additional advantage in that the heating required for the purpose of the present invention does not extend throughout the length of the bar, so that the portion of the bar upon which the greatest strain is placed, viz., the portion between the end fitting and the center fitting and in closer proximity to the latter than to the former, is undisturbed by the heating operation. In addition, the elimination of the seperate tapering operations effects a saving in the cost of expensive machinery necessary to produce the tapering effect by other processes.

As a result of the operation, it will be seen that there are formed in the end of the bar, two portions which extend toward each other, these portions tending to form a bridge between the sides to withstand a collapsing of the open end of the bar.

The length of the channels may be made to suit the needs. In the drawings, I have shown them as of equal length, but it will be understood that this may be varied, as for instance, where it is desired to have a portion of the fitting extend toward the center a greater distance than the remainder of the fitting to provide a protection against wear, such as would be produced by the device striking against the wheel of the vehicle.

In the drawings, I have shown different forms of fittings which may be employed in connection with the bar. In each form, I preferably employ an end member which is adapted to practically close the open end of the bar and strap portions which are adapted to extend into the depressions, the latter being indicated at $20^a$, thus causing the channels to form seats for fitting portions. The general arrangement of the strap portions is shown in Fig. 5 at $21^a$, these having a cross-sectional configuration adapted to practically fit the channel and having the outer face practically continuing the general configuration of the portion of the bar which is not depressed, this arrangement practically preserving the symmetry of the bar and at the same time providing for maximum strength at the ends of the bar without employing heavy and cumbersome fittings, it being understood that the straps differ from a band structure such as is commonly employed in connection with devices of this character.

The connecting portion of the fitting may vary to meet conditions. For instance, in Fig. 10, I have shown the simplest form, wherein the fitting is somewhat similar to a strap 21 bent to form the legs $21^a$ which extend into the channels, said strap being provided with inwardly-extending projecting portions $21^b$ which oppose each other when the strap is in position, said members having a configuration which will approximate the shape of the open end of the bar. This form is preferably applied by first spreading the legs $21^a$ a distance sufficent to permit the passage of the ring, indicated at 22, between the projections $21^b$, after which the legs are bent inward into the channels thus closing the end of the bar. In this form, as well as in the remaining forms, I preferably provide the legs with recesses $21^c$ adjacent their inner ends, these recesses being adapted to receive a band $21^d$, this band being formed of malleable iron and heated prior to the positioning of the fitting, the band being passed over the legs prior to the placing of the fitting in position, the cooling of the band $21^d$ causing a shrinkage sufficient to retain the fitting in position, thus dispensing with the use of bolts or rivets for holding the fitting in its position. By this arrangement, it will be understood that I provide a fitting which does not encircle the end of the bar, with the exception of the band $21^d$, this band acting to retain the strap in its channels and this retaining action serves to prevent the fitting from passing out of the channels under lateral or torsional strains.

The preferred form of fitting is shown in

Fig. 1, in which the legs $21^a$ are connected by a portion $21^e$ which has a configuration to substantially cover the open end of the bar and which is provided with a loop $21^f$ to receive the ring 22. The inner face of the portion $21^e$ is preferably formed with an inwardly-extending web or rib $21^g$ enlarged laterally at its ends, as at $21^h$, these enlargements being adapted to rest against the inner face of the channel walls, thus forming reinforcements to these walls at the ends of the bar. In order to permit the insertion of the ring, the web and leg are cut-away as at $21^j$ in Fig. 1. In this form, the fitting is not spread apart to receive the ring 22, the fitting being simply slipped into position after which the shrinkage of the band $21^d$ acts to secure the fitting in position. This form of fitting, like that shown in Fig. 10, is preferred in connection with swingle or double trees, neck yokes, etc. Where the invention is employed in connection with evener bars, I form the fitting slightly different, in that I provide for the securing of the clevis 23 at the rear of the bar, the clevis encircling the bar as now generally practised, and preferably placing on the band $21^d$ a suitable eye 27 to receive the stay chain used for connecting the evener bar to the vehicle axle. In this form, the web arrangement shown in connection with the preferred form (with the exception that the cut-away portion $21^j$ is omitted) may be employed, the ring-receiving off-set of the form shown in Fig. 1 not being necessary in connection with the fitting of this form. In each form, however, it will be readily seen that the same general characteristics are present, in that the bar is provided with the opposing depressions or channels at the extremities of the major axis; that the fitting is formed with legs instead of a complete band, which legs are of stout material without increasing the weight; that the band $21^d$, acting as an efficient securing means, is relatively inexpensive and does not materially change the configuration of the bar; that the bar is practically imperforate and retains its maximum strength to which is added the strength provided by the change in configuration as well as the bracing produced by the fitting; that the form of the appliance is not radically changed by its use in different connections, the end configuration of the bar being substantially the same in any of its uses, thus enabling the construction of the bar to be provided practically on a standard basis, the length of the bar practically indicating its use and forming the principal difference in construction in the finished bar, thus enabling the use of a single type of machine for forming the end configuration regardless of the use to which the bar is to be put. In addition, this particular arrangement enables interchange of fittings if the same is desired, the leg portions of the fittings being of substantially similar cross-sectional configuration; the main differences being in form and position of the ring-receiving portion, this latter being controlled by the use to which it is to be put.

In connection with the bar, I may and preferably do employ a center fitting structure of the type shown in Figs. 1 and 6, comprising a band 24 and eye $24^a$ which are provided with perforations $24^b$ intermediate the eye and band portion, said perforations permitting the passage of a bolt 25 having a slot $25^a$ to receive a key 26, this arrangement permitting the band to be clamped to the bar. In this arrangement I preferably form a depression $20^b$ to receive a projecting portion or lug $24^c$ of the band portion, this lug acting as a reinforce and at the same time aiding in preventing the band from being shifted circumferentially of the bar. This latter construction is a preferred one, but it will be understood that other arrangements may be employed for this purpose, the invention not being confined to this form.

While I have herein shown and described several ways in which my invention may be carried out, it will be readily understood that changes and modifications therein may be required or desired to meet the exigencies of use, and I therefore desire to be understood as reserving the right to make any and all such changes and modifications as may be required or desired in so far as the same may fall within the spirit and scope of the invention as expressed in the accompanying claims.

Having thus described my invention, what I claim as new is:

1. A metallic tubular draft appliance bar endless in cross-section and flattened to provide major and minor axes cross-sectionally, said bar having longitudinal channels opposing each other and extending inwardly from the end of the bar and located at the extremities of the major axis, the formation of the channels effecting a taper to the bar end, said channels being adapted to form seats for fitting portions.

2. In a draft appliance, a metallic tubular bar endless in cross-section and flattened to provide major and minor axes cross-sectionally, said bar having longitudinal channels opposing each other and extending inwardly from the end of the bar and located at the extremities of the major axis, and fittings carried by said bar and extending into said channels.

3. In a draft appliance, a metallic tubular bar endless in cross-section and flattened to provide major and minor axes cross-sectionally, said bar having longitudinal channels opposing each other and extending inwardly from the end of the bar and located at the extremities of the major axis, the channels terminating short of the longitudinal center of the bar, and fittings carried by said bar and extending into said channels.

4. In a draft appliance, a metallic tubular bar endless in cross-section and flattened to provide major and minor axes cross-sectionally, said bar having longitudinal channels opposing each other and extending inwardly from the end of the bar and located at the extremities of the major axis, an end fitting having legs extending into and fitting said channels, and means for securing the legs within the channels.

5. In a draft appliance, a metallic tubular bar endless in cross-section and flattened to provide major and minor axes cross-sectionally, said bar having longitudinal channels opposing each other and extending inwardly from the end of the bar and located at the extremities of the major axis, an end fitting having legs extending into and fitting said channels, and a band for securing the legs within the channels.

6. In a draft appliance, a metallic tubular bar endless in cross-section and flattened to provide major and minor axes cross-sectionally, said bar having longitudinal channels opposing each other and extending inwardly from the end of the bar and located at the extremities of the major axis, an end fitting bridging the open end of the bar and having legs seated in the channels, said bridge portion having an inwardly-extending web adapted to support the channel walls.

7. In a draft appliance, a metallic tubular bar endless in cross-section and flattened to provide major and minor axes cross-sectionally, said bar having longitudinal channels opposing each other and extending inwardly from the end of the bar and located at the extremities of the major axis, an end fitting bridging and substantially closing the open end of the bar and having legs seated in the channels, and a band for securing the legs within the channels.

8. In a draft appliance, a metallic tubular bar endless in cross-section and flattened to provide major and minor axes cross-sectionally, said bar having longitudinal channels opposing each other and extending inwardly from the end of the bar and located at the extremities of the major axis, the formation of the channels effecting a taper to the bar end, and fittings carried by said bar and extending into said channels.

9. In a draft appliance, a metallic tubular bar endless in cross-section and flattened to provide major and minor axes cross-sectionally, said bar being depressed at one of the extremities of the major axis at a point intermediate and spaced from its ends, and a clip substantially surrounding the bar and having a projection or lug fitting said depression.

10. In a draft appliance, a metallic tubular bar endless in cross-section and flattened to provide major and minor axes cross-sectionally, said bar being depressed at one of the extremities of the major axis at a point intermediate and spaced from its ends, and a clip substantially surrounding the bar and having a projection or lug fitting said depression, said clip having an eye, and means for clamping the clip in position.

In testimony whereof I have affixed my signature in the presence of two witnesses.

JOHN A. BUCHANAN.

Witnesses:
G. L. Rodgers,
Robert J. Long.

Copies of this patent may be obtained for five cents each, by addressing the "Commissioner of Patents, Washington, D. C."